US010270515B2

(12) United States Patent
Lee et al.

(10) Patent No.: US 10,270,515 B2
(45) Date of Patent: Apr. 23, 2019

(54) DISTRIBUTION SYSTEM CONNECTION THROUGH A STATION WORKING AS A NON-ACCESS POINT

(75) Inventors: Jihyun Lee, Anyang-si (KR); Eunsun Kim, Anyang-si (KR); Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 542 days.

(21) Appl. No.: 14/241,380

(22) PCT Filed: Feb. 29, 2012

(86) PCT No.: PCT/KR2012/001532
§ 371 (c)(1), (2), (4) Date: Feb. 26, 2014

(87) PCT Pub. No.: WO2013/032080
PCT Pub. Date: Mar. 7, 2013

(65) Prior Publication Data

US 2015/0016333 A1 Jan. 15, 2015

Related U.S. Application Data

(60) Provisional application No. 61/528,723, filed on Aug. 29, 2011.

(51) Int. Cl.
*H04B 7/155* (2006.01)
*H04W 76/14* (2018.01)
(Continued)

(52) U.S. Cl.
CPC ............ *H04B 7/155* (2013.01); *H04W 16/26* (2013.01); *H04W 76/14* (2018.02); *H04W 88/04* (2013.01); *H04W 40/22* (2013.01); *H04W 84/12* (2013.01)

(58) Field of Classification Search
USPC .......................................................... 370/315
See application file for complete search history.

(56) References Cited

U.S. PATENT DOCUMENTS

2009/0268653 A1* 10/2009 Itagaki ................ H04W 76/023 370/311
2009/0274135 A1* 11/2009 Seok ..................... H04W 76/14 370/338

(Continued)

FOREIGN PATENT DOCUMENTS

KR 10-2008-0074922 8/2008
KR 10-2010-0042207 4/2010

(Continued)

OTHER PUBLICATIONS

NPL: "IEEE Std 802.11e-2005", dated Nov. 11, 2005, by IEEE Computer Society, 3 Park Avenue, New York, NY 10016-5997, USA.*

(Continued)

*Primary Examiner* — Gregory B Sefcheck
*Assistant Examiner* — Majid Esmaeilian
(74) *Attorney, Agent, or Firm* — Lee Hong Degerman Kang Waimey

(57) ABSTRACT

The present invention relates to a method and device for performing a connection to a distribution system (DS) through a station working as a non-access point (AP) in a wireless communication system. In particular, any station (referred to hereinafter as 'a first STA') works as an AP having DS connection performance in first frequency band wireless local area network (WLAN) communication when performing WLAN communication to connect to a distribution system (DS), wherein a direct link setting procedure is performed with a specific STA (referred to hereinafter as 'a second STA') working as a station that is not an AP in second frequency band WLAN communication, in the sec- (Continued)

ond frequency band WLAN communication; and a connection is made to the DS through the direct link in the second frequency band WLAN communication.

11 Claims, 10 Drawing Sheets

(51) Int. Cl.

| | |
|---|---|
| ***H04W 88/04*** | (2009.01) |
| ***H04W 16/26*** | (2009.01) |
| *H04W 84/12* | (2009.01) |
| *H04W 40/22* | (2009.01) |

(56) References Cited

U.S. PATENT DOCUMENTS

2011/0090887 A1* 4/2011 Kim .................... H04W 16/14 370/338
2011/0103264 A1* 5/2011 Wentink ............... H04W 8/005 370/255
2011/0116488 A1* 5/2011 Grandhi .............. H04B 7/0626 370/338
2011/0116489 A1* 5/2011 Grandhi ............... H04W 16/04 370/338
2011/0280234 A1* 11/2011 Wentink ............... H04W 8/005 370/338
2011/0305216 A1* 12/2011 Seok .................. H04W 74/006 370/329
2012/0039284 A1* 2/2012 Barbieri ............... H04W 48/10 370/329
2012/0120892 A1* 5/2012 Freda ................... H04W 8/005 370/329
2012/0165056 A1* 6/2012 Kim ...................... H04W 16/14 455/509
2013/0003679 A1* 1/2013 Seok ................ H04W 74/0808 370/329
2013/0023202 A1* 1/2013 Koskela ................. H04W 4/06 455/3.01
2015/0245399 A1* 8/2015 Aoki ..................... H04W 76/14 370/329
2017/0171895 A1* 6/2017 Kandagadla .......... H04W 24/08

FOREIGN PATENT DOCUMENTS

KR 10-2011-0003370 1/2011
KR 1020110089802 8/2011

OTHER PUBLICATIONS

PCT International Application No. PCT/KR2012/001532, Written Opinion of the International Searching Authority dated Sep. 28, 2012, 16 pages.

* cited by examiner

| | Element ID | Length | Enabling STA Address |
|---|---|---|---|
| Octets : | 1 | 1 | 6 |

| | Element ID | Length | Enabling STA Address | Operating Class | Channel Number |
|---|---|---|---|---|---|
| Octets : | 1 | 1 | 6 | 1 | 1 |

These fields are repeated, as defined in Length field

| | Element ID | Length | Operating Class | Channel Number |
|---|---|---|---|---|
| Octets : | 1 | 1 | 1 | 1 |

FIG. 16

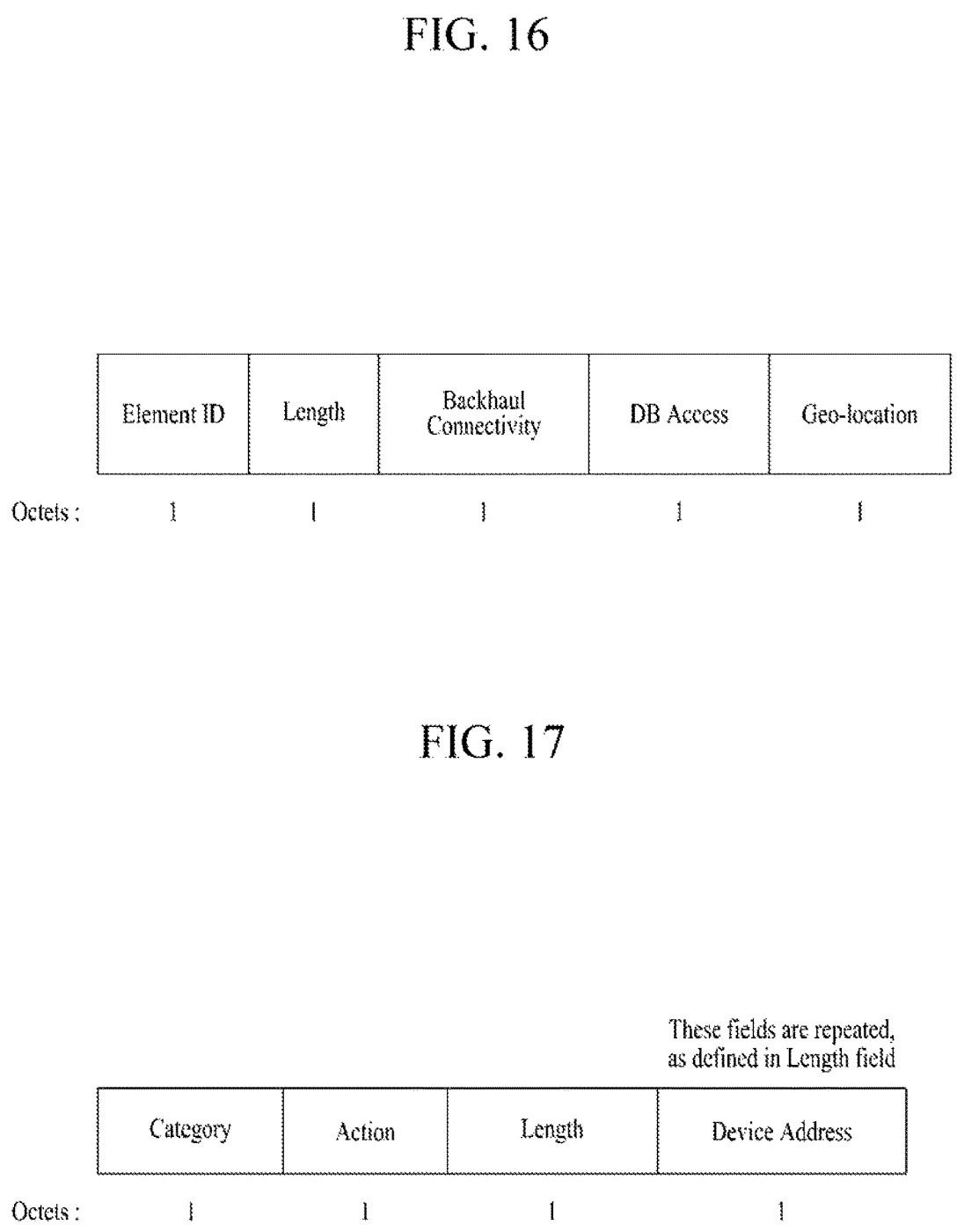

| Element ID | Length | Backhaul Connectivity | DB Access | Geo-location |
|---|---|---|---|---|
| 1 | 1 | 1 | 1 | 1 |

Octets : 1 1 1 1 1

FIG. 17

These fields are repeated, as defined in Length field

| Category | Action | Length | Device Address |
|---|---|---|---|
| 1 | 1 | 1 | 1 |

Octets : 1 1 1 1

DISTRIBUTION SYSTEM CONNECTION THROUGH A STATION WORKING AS A NON-ACCESS POINT

CROSS-REFERENCE TO RELATED APPLICATIONS

This application is the National Stage filing under 35 U.S.C. 371 of International Application No. PCT/KR2012/001532, filed on Feb. 29, 2012, which claims the benefit of U.S. Provisional Application Serial No. 61/528,723, filed on Aug. 29, 2011, the contents of which are all hereby incorporated by reference herein in their entirety.

TECHNICAL FIELD

The present invention relates to a method and device for access to a distribution system (DS) through a station (STA) operating as a non-access point (AP) in a wireless communication system.

BACKGROUND ART

Standard for wireless local area network (WLAN) technology has been developed as the institute of electrical and electronics engineers (IEEE) 802.11 standard. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies orthogonal frequency-division multiplexing (OFDM) at 2.4 GHz to provide a transmission rate of 54 Mbps. IEEE802.11n applies multiple input multiple output (MIMO)-OFDM to provide a transmission rate of 300 Mbps for four spatial streams. IEEE 802.11n supports a channel bandwidth of up to 40 MHz to provide a transmission rate of 600 Mbps.

IEEE 802.11af, which specifies an operation of an unlicensed device in a TV white space (TVWS) band, is being developed.

TVWS includes an ultra high frequency (UHF) band and a very high frequency (VHF) band as a frequency allocated to a broadcast TV and refers to a frequency band in which use of an unlicensed device is permitted under the condition that it does not hinder communication of a licensed device operating at a corresponding frequency band. The licensed device includes a TV, a wireless microphone, etc. The licensed device may be called an incumbent user or a primary user. In addition, in order to overcome a problem in terms of coexistence between unlicensed devices using a TVWS, a signaling protocol such as a common beacon frame, a frequency sensing mechanism, etc. may be required.

Operations of all unlicensed devices are permitted in frequency bands of 512 to 608 MHz and 614 to 698 MHz except in a few special cases. However, in frequency bands of 54 to 60 MHz, 76 to 88 MHz, 174 to 216 MHz, and 470 to 512 MHz, only communication between fixed devices is permitted. Fixed devices refer to devices which transmit signals only in a determined location. An IEEE 802.11 TVWS terminal refers to an unlicensed device operating using an IEEE 802.11 media access control (MAC) layer (or a second layer L2) and a physical layer (PHY) (or a first layer L1) in a TVWS spectrum.

An unlicensed device which desires to use a TVWS should provide a protection function for a licensed device. Accordingly, the unlicensed device must confirm whether the licensed device occupies a corresponding band before starting signal transmission in the TVWS.

To this end, the unlicensed device may confirm whether a corresponding band is being used by the licensed device by performing spectrum sensing. A spectrum sensing mechanism includes energy detection and feature detection. When strength of a signal received through a specific channel is above a prescribed value or when a DTV preamble is detected, the unlicensed may determine that the licensed device is using the specific channel. When it is determined that the licensed device is using a channel immediately adjacent to a currently used channel, the unlicensed device should lower transmission power thereof.

In addition, an unlicensed device may obtain available channel list information in a corresponding area by accessing a geolocation database (DB) through the Internet or a dedicated network. The geolocation DB stores and manages information about registered licensed devices and information about available channels which dynamically vary according to geographic location and channel use time of the licensed devices.

In this specification, a whitespace band includes, but is not limited to, the aforementioned TVWS. In this specification, the term 'whitespace band' refers to a band in which an operation of an unlicensed device is permitted only when an operation of a licensed device is preferentially permitted and the licensed device is protected. In addition, a white space device refers to a device that operates in a whitespace band. A device according to an IEEE 802.11 system may also be an example of the whitespace device. In this case, the whitespace device may refer to an unlicensed device that operates using IEEE 802.11 medium access control (MAC) and a physical layer in a whitespace band. That is, typical AP and/or STA according to 802.11 standard, which operates in a whitespace band, is an example of an unlicensed device.

DISCLOSURE

Technical Problem

An object of the present invention devised to solve the problem lies in a method and device for access to a distribution system (DS), by which an unlicensed device, that is, a station (STA) operating in a whitespace band can acquire information about an available channel and access a DS in a whitespace using the information. DS access of an STA operating in a whitespace band is performed by an access point (AP).

However, when DS access is permitted through a specific STA that does not operate as an AP in a whitespace in a predetermined case and operates as an AP in wireless local area network (WLAN) communication through another frequency band, a WLAN operation can be more effectively defined. Hereinafter, a DS access method through an STA that does not operate as an AP will be described in this specification.

Technical Solution

The object of the present invention can be achieved by providing a method for wireless local area network (WLAN) communication in order to access a distribution system (DS) by a station (hereinafter, referred to as a first STA), the method including performing a direct link setup procedure with a specific STA (hereinafter, referred to as a second STA) in second frequency band WLAN communication, the second STA operating as an access point (AP) having DS access capability in first frequency band WLAN communication and operating as a non-AP STA in the second frequency band WLAN communication, and accessing a DS through direct link established with the second STA in the second frequency band WLAN communication.

In this case, it is assumed that coverage by a specific AP in the second frequency band WLAN communication may be wider coverage by a specific AP in the first frequency band WLAN communication.

It is assumed that the first STA and the second STA may be enabled by the same enabling STA in the second frequency band WLAN communication.

The accessing may include transmitting a packet including a first address field indicating a transmission STA address, a second address field indicating a reception STA address, and a third address field indicating an enabling STA address to the second STA. In this case, the first address field may indicate an address of the first STA, the second address field indicates an address of the second STA, and the third address field may indicate an address of a common enabling STA of the first STA and the second STA.

The performing may include receiving information about DS access capability of the second STA and enabling STA information of the second STA, and transmitting a direct link setup request message to the second STA through the enabling STA when the second STA has DS access capability and an enabling STA of the second STA is the same as an enabling STA of the first STA.

In the aforementioned example, the first frequency band WLAN communication may include 2.4 GHz or 5 GHz band WLAN communication, and the second frequency band WLAN communication may include whitespace band WLAN communication.

In another aspect of the present invention, provided herein is a wireless local area network (WLAN) communication method for providing access to a distribution system (DS) in a station (hereinafter, referred to as a first STA), the method including performing a direct link setup procedure on the first STA in the second frequency band WLAN communication by a specific STA (hereinafter, referred to as a second STA) operating as an access point (AP) having DS access capability in first frequency band WLAN communication and operating as a non-AP STA in the second frequency band WLAN communication, and accessing a DS through direct link established with the first STA in the second frequency band WLAN communication by the first STA.

In this case, it is assumed that coverage by a specific AP in the second frequency band WLAN communication may be wider coverage by a specific AP in the first frequency band WLAN communication.

It is assumed that the first STA and the second STA may be enabled by the same enabling STA in the second frequency band WLAN communication.

The accessing may include receiving a packet including a first address field indicating a transmission STA address, a second address field indicating a reception STA address, and a third address field indicating an enabling STA address from the first STA. The first address field may indicate an address of the first STA, the second address field may indicate an address of the second STA, and the third address field indicates an address of a common enabling STA of the first STA and the second STA.

The accessing may include processing the packet in a first packet and a second packet of the second STA and transmitting the packet to a third layer, and accessing the DS by the first STA based on IP address information recognized in the third layer.

Here, the first frequency band WLAN communication may include 2.4 GHz or 5 GHz band WLAN communication, and the second frequency band WLAN communication includes whitespace band WLAN communication.

In another aspect of the present invention, provided herein is a station (STA) device for wireless local area network (WLAN) communication in order to access a distribution system (DS), the STA device including a first communication module configured to perform first frequency band WLAN communication, a second communication module configured to perform second frequency band WLAN communication, and a processor connected to the first communication module and the second communication module and configured to control the first communication module and the second communication module to perform a direct link setup procedure with a specific STA (hereinafter, referred to as a second STA) in second frequency band WLAN communication, the second STA operating as an access point (AP) having DS access capability in first frequency band WLAN communication and operating as a non-AP STA in the second frequency band WLAN communication, and to access a DS through direct link established with the second STA in the second frequency band WLAN communication.

In another aspect of the present invention, provided herein is a A station (STA) device for wireless local area network (WLAN) communication for providing distribution system (DS) access to a station (hereinafter, referred to as a first STA), the STA device including a first communication module configured to perform first frequency band WLAN communication, a second communication module configured to perform second frequency band WLAN communication, and a processor connected to the first communication module and the second communication module and configured to the first communication module and the second communication module to operate as an access point (AP) having DS access capability in the first frequency band WLAN communication and to operate as a non-AP STA in second frequency band WLAN communication, wherein the processor performs a direct link setup procedure on the first STA through the second communication module in the second frequency band WLAN communication and accesses a DS through direct link established with the first STA in the second frequency band WLAN communication by the first STA.

Advantageous Effects

As is apparent from the above description, a distribution system (DS) access method through a station (STA) that does not operate as an access point (AP) is provided to effectively perform DS access in wider coverage.

DESCRIPTION OF DRAWINGS

FIG. 16 is a diagram illustrating a format of a device capability information element in a TDLS discovery frame broadcast by an STA1 according to an embodiment of the present invention.

FIG. 17 is a diagram illustrating a method of informing an STA2 of information about an STA having backhaul connectivity among STAs associated with the STA3 by the STA3 according to an embodiment of the present invention.

BEST MODE

Hereinafter, exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form. The same reference numbers will be used throughout the drawings to refer to the same or like parts.

First, a general configuration of a wireless local area network (WLAN) system will be described with reference to FIGS. 1 and 2.

Figure 1:
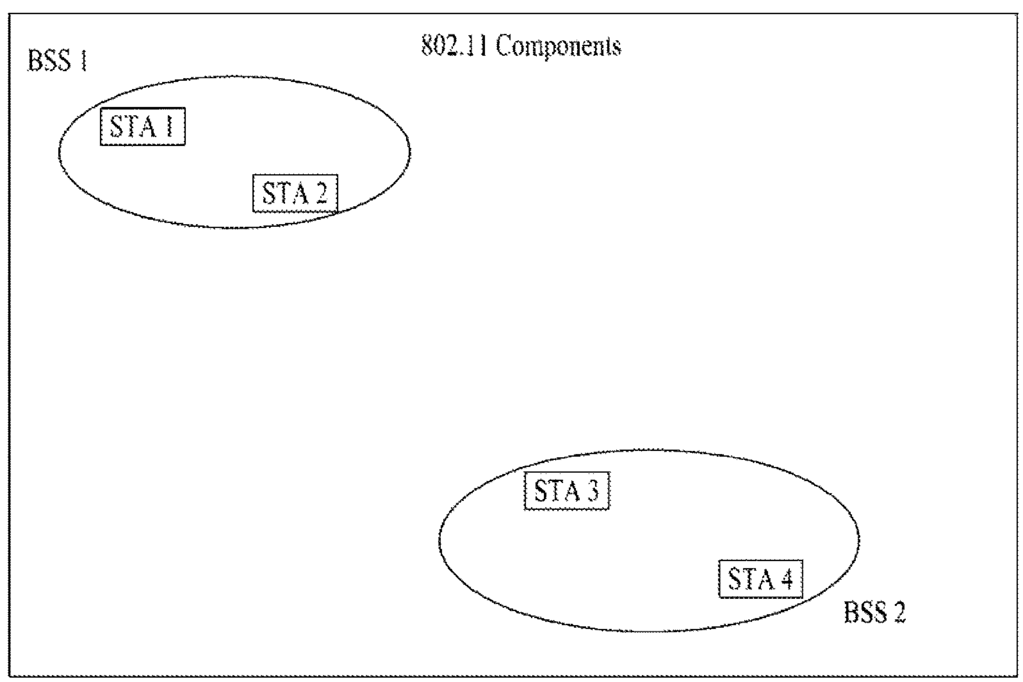
FIG. 1 is a diagram illustrating an example of the configuration of a wireless local area network (WLAN) system.

FIG. 1 is a diagram illustrating an example of the configuration of a WLAN system.

As shown in FIG. 1, the WLAN system includes one or more basis service sets (BSSs). A BSS is a set of STAs which are successfully synchronized to communicate with one another.

An STA is a logical entity that contains a medium access control (MAC) and a physical layer interface to a wireless medium, and includes an access point (AP) and a non-AP STA. A portable terminal manipulated by a user among STAs is a non-AP STA. If we simply say STA, this may indicate a non-AP STA. The non-AP STA may also be referred to as a terminal, a wireless transmit/receive unit (WTRU), a user equipment (UE), a mobile station (MS), a mobile terminal, a mobile subscriber unit, etc.

The AP is an entity that provides access to a distribution system (DS) to associated STAs via a wireless medium. The AP may be referred to as a centralized controller, a base station (BS), a Node-B, a base transceiver system (BTS), a site controller, etc.

BSSs may be classified into infrastructure BSSs and independent BSSs (IBSSs).

The BSSs shown in FIG. 1 are IBSSs. An IBSS refers to a BSS which does not include an AP. Since the IBSS does not include an AP, it forms a self-contained network because no access to a DS is available.

Figure 2:
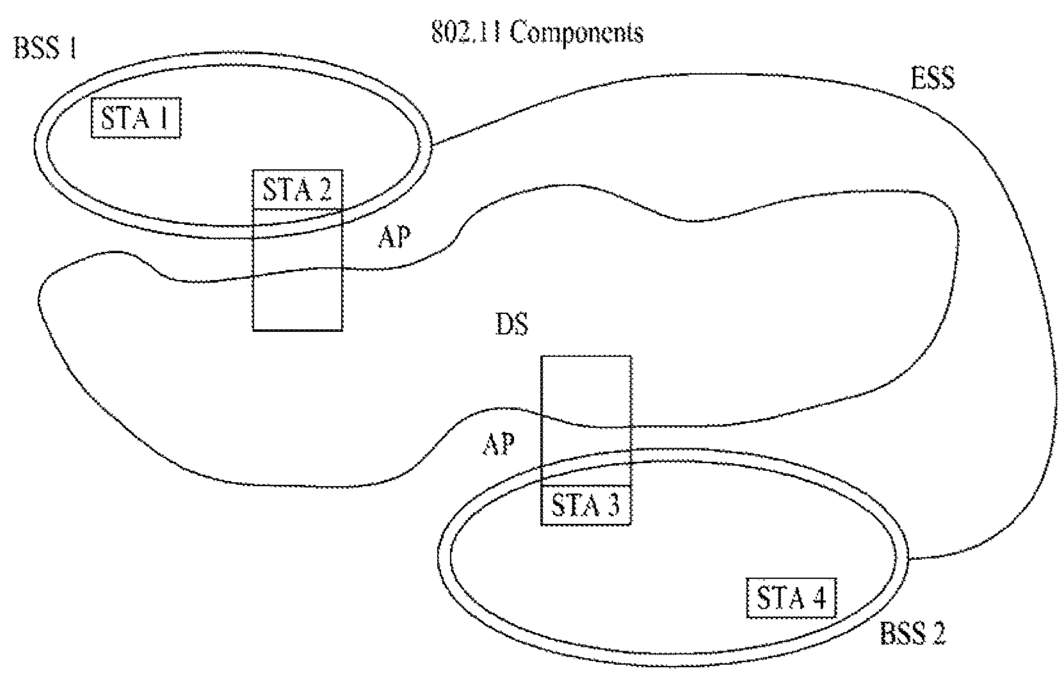
FIG. 2 is a diagram illustrating another example of the configuration of the WLAN system.

FIG. 2 is a diagram illustrating another example of the configuration of the WLAN system.

The BSSs shown in FIG. 2 are infrastructure BSSs. An infrastructure BSS includes one or more STAs and APs. Although communication between non-AP STAs in an infrastructure BSS is performed via an AP in principle, direct communication between the non-AP STAs may be performed when a direct link therebetween is established.

As shown in FIG. 2, a plurality of infrastructure BSSs may be interconnected by use of a DS. A plurality of BSSs connected through the DS is referred to as an extended service set (ESS). STAs included in the ESS may communicate with one another. In the same ESS, a non-AP STA may move from one BSS to another BSS while performing seamless communication.

The DS is a mechanism for connecting a plurality of APs. The DS is not necessarily a network, and has no format limitation as long as a prescribed distribution service can be provided. For example, the DS may be a wireless network such as a mesh network, or may be a physical construction for interconnecting APs.

As described above, hereinafter, a method for acquiring DS connection via direct link setup with a non-AP STA having backhaul connectivity by a STA will be described.

A multi radio STA is an STA that supports two or more radio frequency bands. For example, the multi radio STA may belong to a terminal that supports both a TVWS band and a band of 2.4 GHz/5 GHz. The multi radio STA may have all PHY/MAC protocol stacks used in each frequency band and perform different roles according to functions embodied in the respective frequency bands.

For example, an STA that supports a dual wireless band of a band of 2.4 GHz/5 GHz and a TVWS band functions as an AP in a band of 2.4 GHz/5 GHz, but functions as a non-AP in a TVWS band.

Hereinafter, for convenience of description with regard to embodiments of the present invention, an STA is assumed to have the following types of STAs according to an operation per frequency band.

STA1: which operates as an AP in a band of 2.4 GHz/5 GHz and operates as a non-AP in a TVWS band.

STA2: which operates as a non-AP in both a band of 2.5 GHz/5 GHz and a TVWS band.

STA3: which operates as an AP in a TVWS band.

Figure 3:
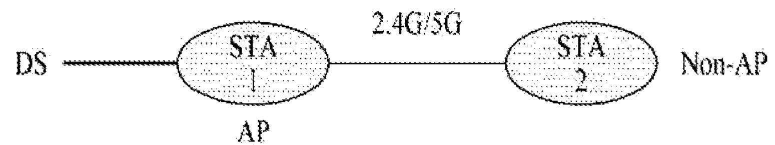
FIG. 3 is a diagram illustrating a BSS operation in a band of 2.4 GHz/5 GHz based on definitions of station (STA) types.

FIG. 3 is a diagram illustrating a BSS operation in a band of 2.4 GHz/5 GHz based on the aforementioned definitions of the STA types.

The STA1 having backhaul connectivity operates an AP in a band of 2.4 GHz/5 GHz. The STA 2 as a non-AP STA may receive a beacon from the STA1, may transmit a probe request message to the STA1 to discover the STA1, and may establish a link with the STA1 to acquire DS access.

Figure 4:
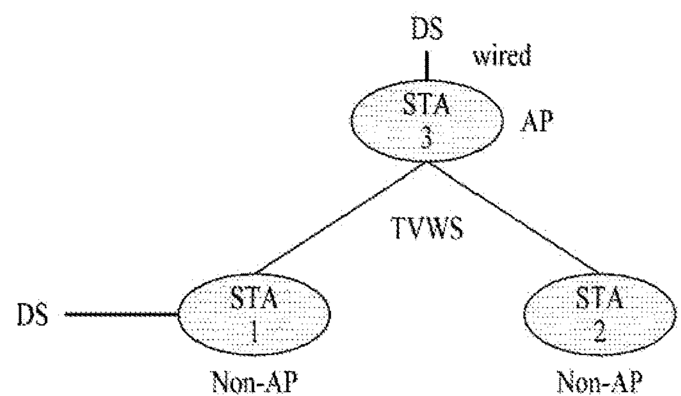
FIG. 4 is a diagram illustrating an operation of a BSS in a TV white space (TVWS) band based on definitions of the STA types.

FIG. 4 is a diagram illustrating an operation of a BSS in a TVWS band based on the aforementioned definitions of the STA types.

For the TVWS operation, non-AP STAs need to receive an enabling signal from an AP STA and to successfully complete an enabling procedure. That is, the AP STA in a TVWS may also be an enabling STA. The enabling signal is a signal for permitting signal transmission to a TVWS non-AP STA. In order to transmit a signal in a TVWS, the non-AP STA needs to receive an enabling signal from an enabling STA. The enabling procedure refers to a procedure for permitting a TVWS operation to the non-AP STA that receives the enabling signal.

According to the aforementioned definitions of the STA types, the STA1 and the STA2 are each a multi radio STA that supports both a band of 2.4 GHz/5 GHz and a TVWS band. In this example, the STA1 and the STA2 are assumed to receive the enabling signal from the STA3 and to be enabled and may acquire DS access through the STA3.

The STA1 and the STA2 are each a non-AP STA but have the following difference. The STA1 has backhaul connectivity, whereas the STA2 does not. Accordingly, the STA1 may directly access a DS without the STA3. Accordingly, the STA1 may directly access a DS without the STA3.

Figure 5:
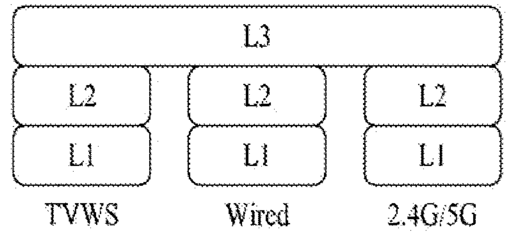
FIG. 5 is a diagram illustrating the configuration of a protocol stack to be included in a processor of a multi radio STA.

FIG. 5 is a diagram illustrating the configuration of a protocol stack to be included in a processor of a multi radio STA.

As illustrated in FIG. 5, the multi radio STA may have a plurality of protocol stacks. In particular, the multi radio STA may have radio PHY(L1)/MAC(L2) constituting backhaul connectivity to achieve DS access.

However, an AP role may or may not be performed according to a function embodied in a corresponding frequency hand. Here, the AP role is to enable DS access of another STA. The STA1 is assumed to have an AP role in a band of 2.4 GHz/5 GHz and not to have an AP role in a TVWS band, as described in the aforementioned definitions of the STA types.

The STA3 may provide DS access to another STA in a TVWS band. However, an STA among STA3s may be designed to be specialized to only an enabling function in a TVWS band. The STA3 may have a limited band and perform only authentication of the STA1 or the STA2 and DB access. In this case, when the STA1 or the STA2 are enabled from the STA3 once and transmits a signal in a TVWS, the STA1 or the STA2 may establish a link with another whitespace band AP and transmit data.

An STA that has backhaul connectivity and operates as an AP provides DS access to a non-AP STA, as described above.

Figure 6:
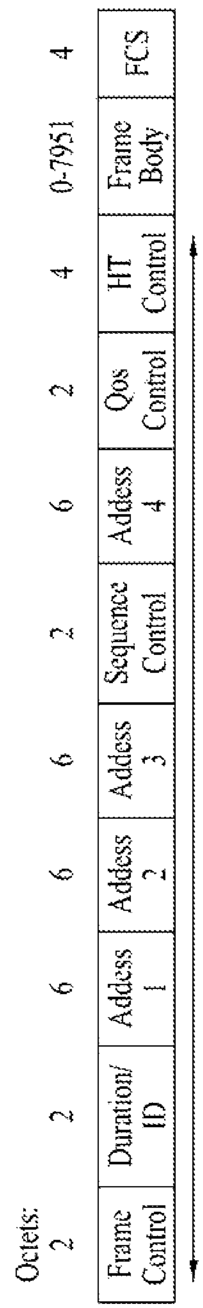
FIG. 6 is a diagram illustrating a formatof a packet that is transmitted to an STA1 from an STA2 in a band of 2.4 GHz/5 GHz.

FIG. 6 is a diagram illustrating a format of a packet that is transmitted to an STA1 from an STA2 in a band of 2.4 GHz/5 GHz.

The STA1 may periodically transmit a beacon and the STA2 may listen to the beacon and access an AP (STA1), in a band of 2.4 GHz/5 GHz. A packet transmitted to a DS from the STA2 through the STA1 may have the format illustrated in FIG. 6.

FIG. 6 illustrates an example in which a packet includes four address fields. However, a specific address field may not be used according to use of the corresponding field. In this example, it is assumed that a first address field indicates a reception STA address, a second address field indicates a transmission STA address, and a third address field indicates a destination address. In this case, it is assumed that the first address field indicates an address of the STA1, the second address field indicates an address of the STA2, and the third address field indicates a DS (or a default gateway) address.

Figure 7:
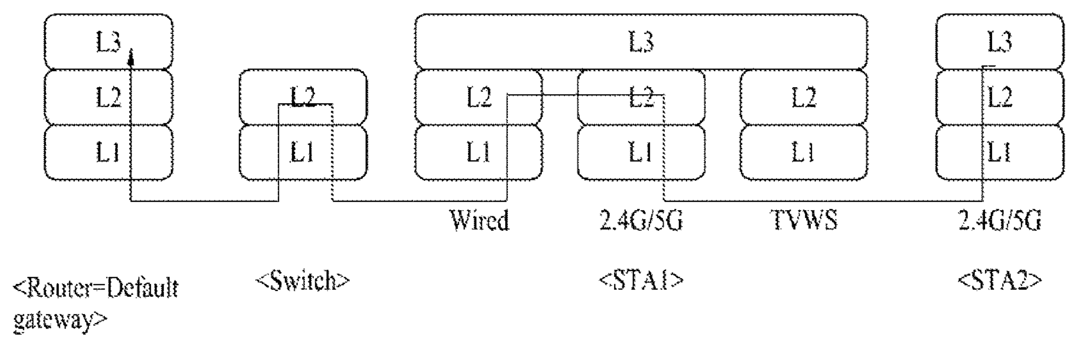
FIG. 7 is a diagram for explanation of a path for access of an STA2 to a DS through an STA1 in a band of 2.4 GHz/5 GHz as illustrated in FIG. 3.

FIG. 7 is a diagram for explanation of a path for access of an STA2 to a DS through an STA1 in a band of 2.4 GHz/5 GHz as illustrated in FIG. 3.

A destination address of a MAC frame transmitted by the STA2 is set as a DS, and thus, the STA1 that receives the MAC frame may read a MAC header in an L2 and transmit the corresponding frame to a default gateway. That is, the STA2 does not necessarily transmit a received packet to an L3 and may transmit the corresponding packet to switch/default gateway with reference to a destination address only.

The default gateway may perform routing with reference to a destination IP address of an L3 packet and then transmit the corresponding packet to a next router of an appropriate path.

An embodiment of the present invention proposes an example in which a geolocation database control (GDC) link identifier and a white space map (WSM) are added to a beacon or probe response transmitted by the STA1 in a band of 2.4 GHz/5 GHz.

Figure 8:
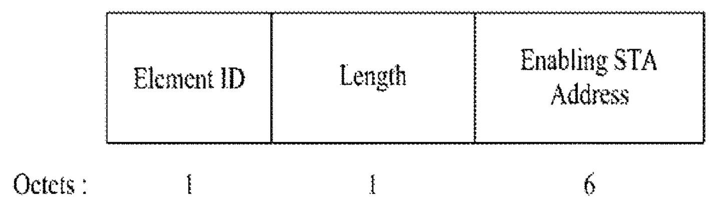
FIGS. 8 and 9 is a diagram illustrating an embodiment in which a beacon or probe response transmitted by an STA1 in a band of 2.4 GHz/5 GHz includes a GDC link identifier and/or a white space map (WSM).
Figure 9:
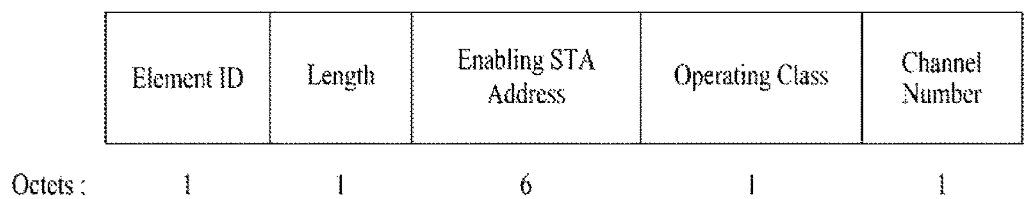

FIGS. 8 and 9 are diagrams illustrating an embodiment in which a beacon or probe response transmitted by an STA1 in a band of 2.4 GHz/5 GHz includes a GDC link identifier and/or a WSM.

In detail, FIG. 8 illustrates a format of a GDC link identifier element, and FIG. 9 illustrates a format of a GDC link identifier element that further includes an operation channel field. In FIGS. 8 and 9, an enabling STA address field may refer to a MAC address of an AP STA obtained by enabling an STA that transmits a GDC link identifier with 6 octets. In FIG. 9, a combination of a channel number file and an operation class field may indicate an operation channel number of an STA indicated by the enabling STA address. According to the present embodiment, the STA1 is assumed to transmit a GDC link identifier in a band of 2.4 GHz/5 GHz in the situation illustrated in FIGS. 3 and 4. A STA address of the GDC link identifier may refer to a MAC address of the STA3. In this case, an operation class and a channel number may refer to a TVWS operation channel number of the STA3.

Figures 10, 11:
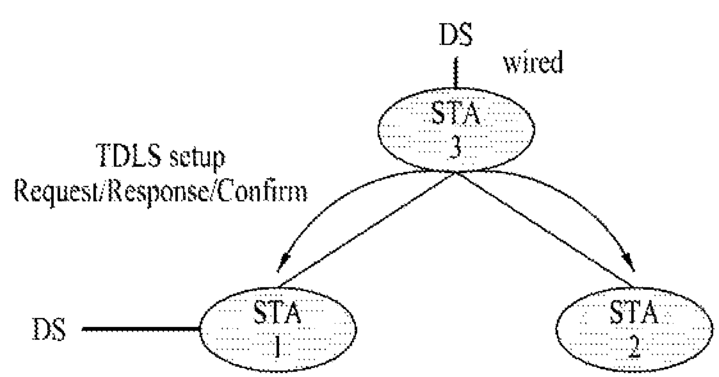
FIG. 10 is a diagram illustrating a format in which an STA1 transmits a WSM for indicating an operation channel of an enabling STA separately from a geolocation database control (GDC) link identifier in a band of 2.4 GHz/5 GHz.
FIGS. 11 and 12 are diagrams for explanation of a procedure for establishing direct line in a TVWS band by the STA1 and the STA2.

As illustrated in FIG. 8, when the GDC link identifier is transmitted, the GDC link identifier may not include operation channel information and may be formed in the form of a WSM illustrated in FIG. 10 added to a beacon/probe response message.

FIG. 10 is a diagram illustrating a format in which an STA1 transmits a WSM for indicating an operation channel of an enabling STA separately from a GDC link identifier in a band of 2.4 GHz/5 GHz.

As illustrated in FIG. 10, an operation class field and a channel number field may be repeated.

The STA2 operates as a non-AP in a band of 2.4 GHz/5 GHz and is associated with the STA1. The STA2 may receive a GDC link identifier element from the STA1 to acquire information of an STA (STA3) obtained by enabling the STA1 in a TVWS. That is, a MAC address corresponding to an enabling STA address may be an identifier of an enabling STA of the STA1. A combination of an operation class and a channel number indicates an operation channel of an enabling STA.

When the STA2 that receives a GDC link identifier deviates from coverage of 2.4 GHz/5 GHz of the STA1, the STA1 signal may be weakened. Accordingly, the STA1/STA2 searches for the STA3 in a TVWS. In order to discover the STA3, the STA2 may search for an AP having an enabling STA address of a GDC link identifier in a TVWS channel indicated by an operation class and a channel number of the GDC link identifier or WSM. Accordingly, when the STA2 discovers the STA3, the STA2 may receive an enabling signal from the STA3 and thus may be enabled in a TVWS. When the STA2 is enabled, the STA2 may access the STA3 and then acquire DS access through the STA3.

An embodiment of the present invention proposes a method of performing DS access through an STA1 by an STA2 through the STA1 instead of an STA3 in a TVWS. To this end, the STA2 is assumed to establish a direct line with the STA1.

Figure 12:
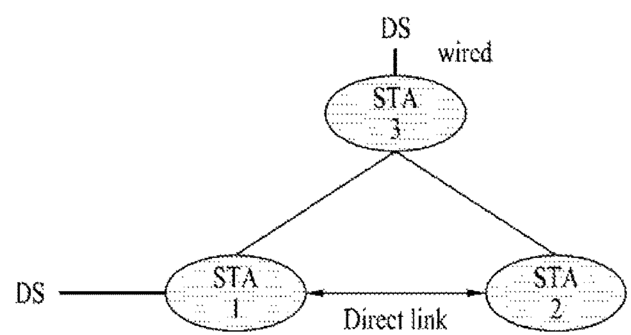

FIGS. 11 and 12 are diagrams for explanation of a procedure for establishing a direct line in a TVWS band by the STA1 and the STA2.

As illustrated in FIG. 11, the STA1 may perform a tunneled direct link setup (TDLS) procedure in a TVWS together with the STA2. This procedure may be performed through the STA3.

For direct link setup, (1) first, the STA2 may perform TDLS setup request on the STA1 (through the STA3) and (2) the STA1 may perform TDLS response on the STA2 (through the STA3). Then, (3) the STA2 may encapsulate a TDLS confirm management operating frame in a data frame and transmit the data frame to the STA1.

When TDLS is successfully completed, the STA2 may transmit data transmitted to a DS through direct link with the STA1, as illustrated in FIG. 12. The present embodiment proposes an example in which a MAC frame header of a packet transmitted to the STA1 from the STA2 through TVWS direct link includes (1) a first address field indicating a transmission STA address, (2) a second address field indicating a reception STA address, and (3) a third address field indicating an enabling STA address. When the address fields are established, the first address field may indicate an address of the STA2, the second address field may indicate an address of the STA1, and the third address field may indicate an address of the STA3 as an address of a common enabling STA of the first STA and the second STA.

Figure 13:
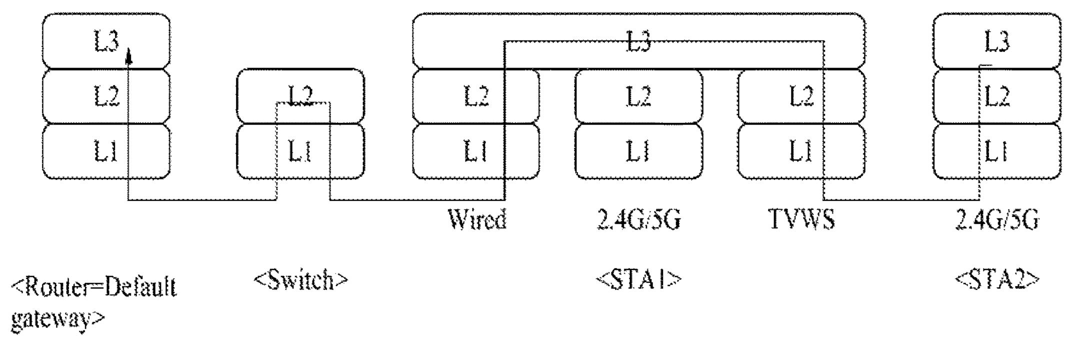
FIG. 13 is a diagram for explanation of a path for transmitting a packet when an STA2 acquires DS access through an STA1 according to an embodiment of the present invention.

FIG. 13 is a diagram for explanation of a path for transmitting a packet when an STA2 acquires DS access through an STA1 according to an embodiment of the present invention.

According to the present embodiment, the STA1 is a peer STA of the STA2. A case in which the STA1 operates as an AP in a band of 2.4 GHz/5 GHz as illustrated in FIG. 3 is different from a case in which the STA1 operates as a non-AP in a TVWS as illustrated in FIG. 12.

In detail, when the STA1 is a non-AP STA, the STA1 may not transmit a frame to a router with reference to a MAC header of an L2 MAC frame received from the STA2 and may confirm a destination IP address in an L3 as an IP layer and determine whether a corresponding packet is transmitted to a default gateway, as illustrated in FIG. 13. This is because the STA1 cannot determine whether a final destination of the corresponding packet is the STA1 or an object outside a subnet with reference to only an address of a MAC header.

Figure 14:
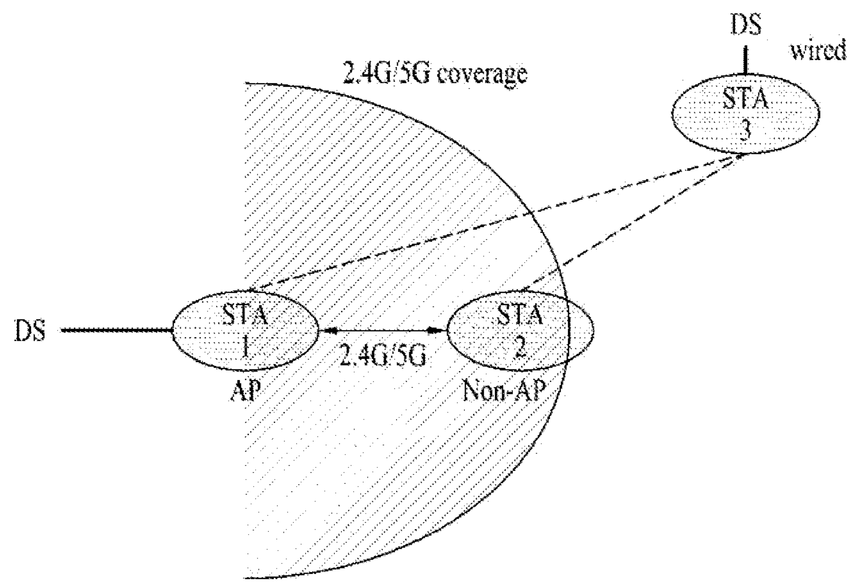
FIGS. 14 and 15 are diagrams for explanation of expansion of DS access coverage by performing DS access via TVWS direct link with an STA1 according to an embodiment of the present invention.
Figure 15:
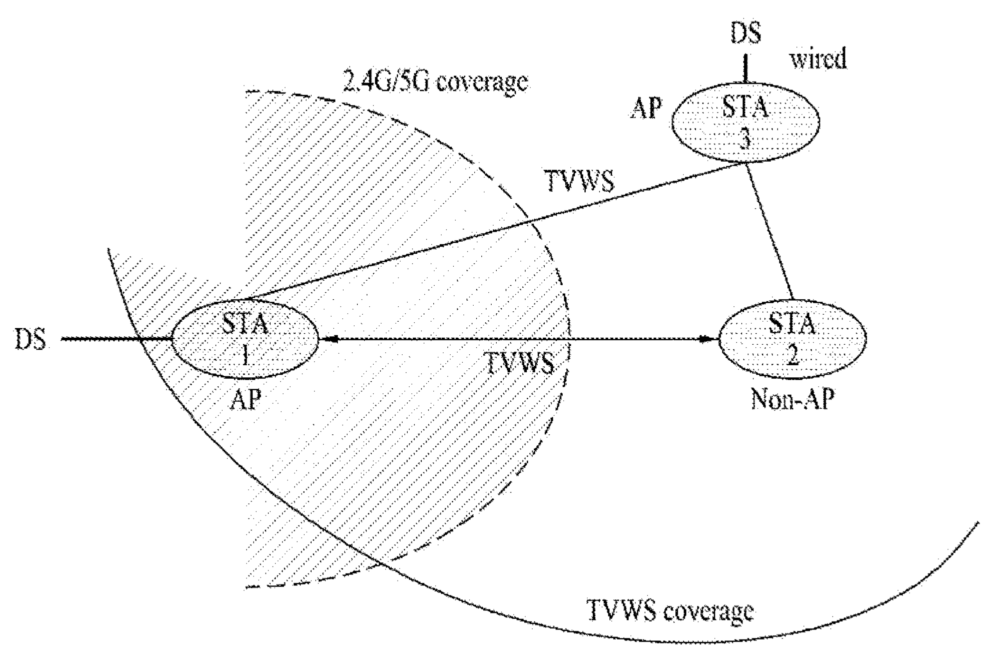

FIGS. 14 and 15 are diagrams for explanation of expansion of DS access coverage by performing DS access via TVWS direct link with an STA1 according to an embodiment of the present invention.

As illustrated in FIG. 14, an STA2 acquires DS access through the STA1 in a band of 2.4 GHz/5 GHz. However, according to the present embodiment, as illustrated in FIG. 15, even if the STA2 deviates from 2.4 GHz/5 GHz band coverage of the STA1, the STA2 may establish direct link with the STA1 in a TVWS band having excellent radio propagation performance to continuously acquire DS access through the STA1.

According to embodiments of the present invention, the STA1 and the STA2 receive an enabling signal from the STA3 to be enabled and then perform association in a TVWS. An embodiment of the present invention proposes an example in which the STA1 that successfully performs association broadcasts a TDLS discovery frame in order to guide the STA2 to request direct link setup with the STA1. The present embodiment proposes an example in which TDLS discovery includes a GDC line identifier and a device capability element, as shown in Table 1 below.

TABLE 1

| Sequence | Information |
|---|---|
| 1 | Category |
| 2 | Operation |
| 3 | Device capability |
| 4 | GDC link identifier |

In Table 1 above, a device capability field may indicate capability of an STA in a TVWS, and an embodiment of the present invention proposes that this field indicates backhaul connectivity of the STA. When backhaul connectivity is 1, this may mean that an STA that transmits TDLS discovery has backhaul connectivity. When backhaul connectivity is a value other than 1, this may mean that the STA has no backhaul connectivity.

FIG. 16 is a diagram illustrating a format of a device capability information element in a TDLS discovery frame broadcast by an STA1 according to an embodiment of the present invention.

In the aforementioned embodiment, the STA1 may broadcast performance information of the STA1 in a TDLS discovery frame. In detail, among information elements in Table 1 above, the device capability information element may include backhaul connectivity, DB access capability, etc. of the device, as illustrated in FIG. 16. FIG. 16 illustrates a case in which transmitted device capability information element includes geolocation information of the device.

In the aforementioned embodiment, upon receiving TDLS discovery from the STA1 in a TVWS, the STA2 may determine whether a BSS associated with the STA1 is the same as a BSS associated with the STA2 from an enabling STA address of a GDC link identifier.

When the enabling STA address of the GDC line identifier is the same as an AP (or an enabling STA) of the STA2 and a backhaul connectivity field of performance capability indicates 1, the STA2 may establish direct link with the STA1 to perform DS access. That is, as described with reference to FIGS. 11 and 12, the STA2 may encapsulate TDLS setup request on the STA1, TDLS setup response, and confirm management operating frame to a data frame and transmit the data frame to the STA1.

When the TDLS is successfully completed, the STA2 may transmit and receive an Internet packet using backhaul connectivity of the STA1.

Another embodiment of the present invention proposes an example in which the STA3 as an enabling STA of a TVWS informs the STA2 of information of an STA having DS access instead of directly broadcasting capability information of the STA3.

According to the present embodiment, when the STA1 is associated with the STA3 in a TVWS, a connection request frame transmitted to the STA3 from the STA1 may transmit device capability information shown in Table 2 below.

TABLE 2

| Sequence | Information |
|---|---|
| 24 | Device Capability |

According to the present embodiment, the STA3 may transmit a list of STAs having backhaul connectivity among STAs associated with the STA3 to the STA2.

FIG. 17 is a diagram illustrating a method of informing an STA2 of information about an STA having backhaul connectivity among STAs associated with the STA3 by the STA3 according to an embodiment of the present invention.

According to the present embodiment, the STA3 may transmit a frame illustrated in FIG. 17 to the STA1. That is, the STA3 may transmit a MAC address of an STA, a backhaul connectivity of device capability of which is established to 1, among associated STAs to the STA2 in the form of a list.

As illustrated in FIG. 17, the device address field may be repeated. Each device address field may indicate MAC addresses of an STA, backhaul connectivity of which is established to 1.

The STA2 that receives the frame from the STA3 may request direct link setup to an STA (e.g., the STA1) contained in a list of the received TDLS discovery. When direct link setup is successfully completed, the STA2 may transmit and receive an Internet packet via backhaul connectivity of the STA1.

Based on the aforementioned detailed description, the configuration of an STA device for performing the aforementioned WLAN communication method will be described below.

Figure 18:
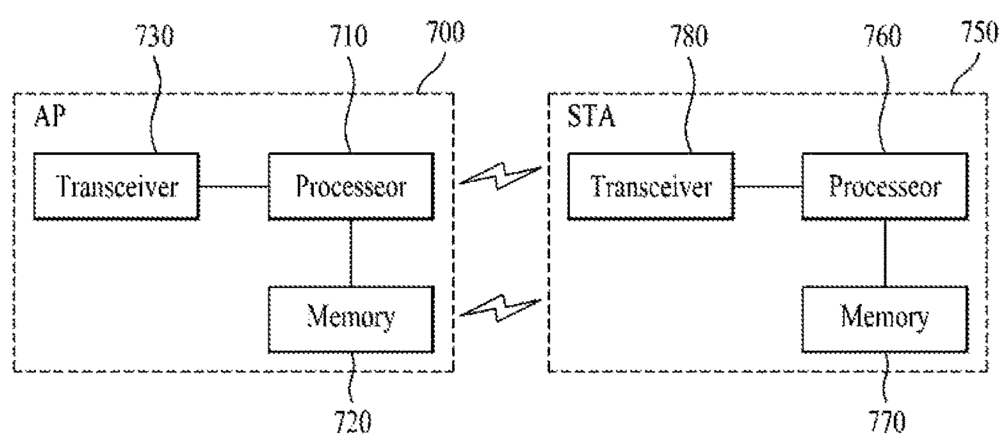
FIG. 18 is a schematic diagram illustrating the configuration of an STA device for WLAN communication according to an embodiment of the present invention.

FIG. 18 is a schematic diagram illustrating the configuration of an STA device 750 for WLAN communication according to an embodiment of the present invention.

As illustrated in FIG. 18, the STA device 750 may include a transceiver 780 for transceiving a WLAN signal, a memory 770 for temporarily storing the transceived signal, and a processor 760 connected to the transceiver 780 and the memory 770 for controlling the transceiver 780 and the memory 770. This configuration may also be similar to an AP 700 that communicates with an STA.

Under this basic configuration, an STA device according to the present invention may include a dual band or multiband radio module including a first communication module for first frequency band WLAN communication and a second communication for second frequency band WLAN. The dual band or multiband radio module may be embodied as a plurality of transceivers 780 of FIG. 18 or may be embodied by functionally dividing on transceiver 780 by the processor 760.

When the STA device 750 of FIG. 18 corresponds to the STA2 according to the aforementioned embodiments, the processor 760 may be connected to the first communication module and the second communication module to control the first communication module and the second communication module to perform a direct link setup procedure on the STA1 in a TVWS band and to access a DS via the direct link.

When the STA device 750 of FIG. 18 corresponds to the STA1 according to the aforementioned embodiments, the processor 760 may be configured to control the STA device 750 to operate as an AP STA in a band of 2.4 GHz/5 GHz and operate as a non-AP STA in a TVWS band and to perform a direct link setup procedure of the STA2 to provide DS access of the STA2.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned embodiments of the present invention have been described in terms of an IEEE 802.11 system, the present invention is applicable to various mobile communication systems in which an unlicensed device acquires available channel information and operates in the same way.

The invention claimed is:

1. A method for wireless local area network (WLAN) communication for accessing a distribution system (DS) by a first station, the method comprising:

performing a direct link setup procedure with a second STA in a second frequency band through a third STA, the direct link setup procedure including:

a) receiving information on a DS access capability of the second STA and enabling STA information of the second STA: and b) transmitting a direct link setup request message to the second STA through the third STA when the second STA has DS access capability and the third STA is an enabling STA of the second STA and an enabling STA of the first STA, wherein the third STA is a common enabling STA of the first STA and the second STA, wherein the first STA and the second STA establish a direct link in the second frequency band based on the direct link setup procedure, wherein the second STA operates as an access point (AP) having a DS access capability in a first frequency band and operates as a non-AP STA in the second frequency band, and wherein a coverage of the second frequency band is wider than a coverage of the first frequency band; and accessing the DS through using the second STA, wherein the first STA accesses the DS based on the second STA operated as the AP using a first type frame when the first STA is included in the coverage of the first frequency band regardless of the second frequency band, wherein the first STA accesses the DS based on the established direct link with the second STA using a second type frame when the first STA is out of the coverage of the first frequency band and is included in the coverage of the second frequency band, wherein a frame format of the first type frame is different from a frame format of the second type frame, wherein the first type frame includes address information of the first STA, the second STA and a DS address, and wherein the second type frame includes address information of the first STA, the second STA and the third STA.

2. The method according to claim 1, wherein the second type frame includes a packet comprising a first address field indicating a transmission STA address, a second address field indicating a reception STA address, and a third address field indicating an enabling STA address to the second STA.

3. The method according to claim 2, wherein the first address field indicates an address of the first STA, the second address field indicates an address of the second STA, and the third address field indicates an address of the third STA.

4. The method according to claim 1, wherein:

the first frequency band comprises 2.4 GHz or 5 GHz band WLAN communication; and the second frequency band comprises whitespace band WLAN communication.

5. A wireless local area network (WLAN) communication method for providing access to a distribution system (DS) in a first station, the method comprising:

performing a direct link setup procedure with a second STA in a second frequency band through a third STA, the direct link setup procedure including:

a) transmitting information on a DS access capability of the second STA and enabling STA information of the second STA; and b) receiving a direct link setup request message to the second STA through the third STA when the second STA has DS access capability and the third STA is an enabling STA of the second STA and an enabling STA of the first STA, wherein the third STA is a common enabling STA of the first STA and the second STA, wherein the first STA and the second STA establish a direct link in the second frequency based on the direct link setup procedure, wherein the first STA operates as an access point (AP) having a DS access capability in a first frequency band and operating as a non-AP STA in the second frequency band, and wherein a coverage of the second frequency band is wider than a coverage of the first frequency band; and accessing the DS, wherein the first STA operated as the AP accesses the DS using a first type frame when the second STA is included in the coverage of the first frequency band regardless of the second frequency band, wherein the first STA operated as the non-AP accesses the DS based on the established direct link with the second STA using a second type frame when the second STA is out of the coverage of the first frequency band and is included in the coverage of the second frequency band, wherein a frame format of the first type frame is different from a frame format of the second type frame, wherein the first type frame includes address information of the first STA, the second STA and a DS address, and wherein the second type frame includes address information of the first STA, the second STA and the third STA.

6. The method according to claim 5, wherein the second type frame includes a packet comprising a first address field indicating a transmission STA address, a second address field indicating a reception STA address, and a third address field indicating an enabling STA address from the first STA.

7. The method according to claim 6, wherein the first address field indicates an address of the first STA, the second address field indicates an address of the second STA, and the third address field indicates an address of the third STA.

8. The method according to claim 7, wherein the accessing comprises:

processing the packet in a first layer and a second layer of the second STA and transmitting the packet to a third layer; and accessing the DS by the first STA based on IP address information recognized in the third layer.

9. The method according to claim 5, wherein the first frequency band comprises 2.4 GHz or 5 GHz band; and the second frequency band WLAN communication comprises whitespace band.

10. A first station (STA) device for wireless local area network (WLAN) communication in order to access a distribution system (DS), the first STA device comprising:

a first communication module configured to perform a first frequency band; a second communication module configured to perform a second frequency band; and a processor connected to the first communication module and the second communication module and configured to control the first communication module and the second communication module to perform a direct link setup procedure with a second STA in the second frequency band through a third STA, the direct link setup procedure including:

a) receiving information on a DS access capability of the second STA and enabling STA information of the second STA; and b) transmitting a direct link setup request message to the second STA through the third STA when the second STA has DS access capability and the third STA is an enabling STA of the second STA and an enabling STA of the first STA, wherein the third STA is a common enabling STA of the first STA and the second STA, wherein a direct link with the second STA in the second frequency is established based on the direct link setup procedure, wherein the second STA operates as an access point (AP) having a DS access capability in the first frequency band and operates as a non-AP STA in the second frequency band, and wherein a coverage of the second frequency band is wider than a coverage of the first frequency band, and access the DS using the second STA, wherein the first STA accesses the DS based on the second STA operated as the AP using a first type frame when the first STA is included in the coverage of the first frequency band regardless of the second frequency band, wherein the first STA accesses the DS based on the established direct link with the second STA using a second type frame when the first STA is out of the coverage of the first frequency band and is included in the coverage of the second frequency band, wherein a frame format of the first type frame is different from a frame format of the second type frame, wherein the first type frame includes address information of the first STA, the second STA and a DS address, and wherein the second type frame includes address information of the first STA, the second STA and the third STA.

11. A second station (STA) device for wireless local area network (WLAN) communication for providing distribution system (DS) access to first station, the second STA device comprising:

a first communication module configured to perform a first frequency band; a second communication module configured to perform a second frequency band; and a processor connected to the first communication module and the second communication module and configured to control the first communication module and the second communication module to operate as an access point (AP) having a DS access capability in the first frequency band and to operate as a non-AP STA in the second frequency band, wherein a direct link with the first STA is established based on the direct link setup procedure through a third STA, wherein the third STA is a common enabling STA of the first STA and the second STA, wherein a coverage of the second frequency is wider than a coverage of the first frequency band, and wherein the processor is configured to:

perform a direct link setup procedure on the first STA through the second communication module in the second frequency band, the direct link setup procedure including:

a) transmitting information on a DS access capability of the second STA and enabling STA information of the second STA: and b) receiving a direct link setup request message to the second STA through the third STA when the second STA has DS access capability and the third STA is an enabling STA of the second STA and an enabling STA of the first STA, and access the DS, wherein the second STA operated as the AP accesses the DS using a first type frame when the first STA is included in the coverage of the first frequency band regardless of the second frequency band, wherein the second STA operated as the non-AP accesses the DS based on the established direct link with the first STA using a second type frame when the first STA is out of the coverage of the first frequency band and is included in the coverage of the second frequency band, wherein a frame format of the first type frame is different from a frame format of the second type frame, wherein the first type frame includes address information of the first STA, the second STA and a DS address, and wherein the second type frame includes address information of the first STA, the second STA and the third STA.

* * * * *